United States Patent [19]

Alperovich et al.

[11] Patent Number: 5,896,376
[45] Date of Patent: Apr. 20, 1999

[54] OPTIMAL USE OF LOGICAL CHANNELS WITHIN A MOBILE TELECOMMUNICATIONS NETWORK

[75] Inventors: Vladimir Alperovich; Ranjit Bhatia, both of Dallas, Tex.

[73] Assignee: Ericsson Inc., Research Triangle Park, N.C.

[21] Appl. No.: 08/766,727

[22] Filed: Dec. 13, 1996

[51] Int. Cl.$^6$ .................................................. H04Q 7/28
[52] U.S. Cl. .......................... 370/348; 370/459; 370/341; 370/437; 370/332; 455/434; 455/509; 455/515; 340/825.51
[58] Field of Search ..................... 370/347, 431, 370/459, 444, 337, 280, 328, 322, 348, 458, 336, 329, 321, 341, 437, 332; 455/434, 450, 455, 509, 515, 516, 62, 466; 340/825.5, 825.03, 825.51

[56] References Cited

U.S. PATENT DOCUMENTS

| | | | |
|---|---|---|---|
| 5,457,680 | 10/1995 | Kamm et al. | 370/332 |
| 5,483,666 | 1/1996 | Yamada et al. | 455/62 X |
| 5,636,223 | 6/1997 | Reardon et al. | 370/431 |
| 5,710,973 | 1/1998 | Yamada et al. | 370/337 X |
| 5,729,534 | 3/1998 | Jokinen et al. | 370/337 X |

FOREIGN PATENT DOCUMENTS

| | | | |
|---|---|---|---|
| 0 545 533 A2 | 6/1993 | European Pat. Off. | |
| WO 93/10600 | 5/1993 | WIPO | |

OTHER PUBLICATIONS

Publication by S. Collesei, P. di Tria and G. Morena; "*Short Message Service Based Applications in the GSM Network*"; Sep. 18, 1994; IEEE International Symposium on Personal, Indoor and Mobile Radio Communications, vol. 3; pp. 939–943.

Publication by Jun Okabe and Takeshi Yamagami; "*Software for a United States TDMA System Cellular Portable Telephone*"; Dec. 1995; Oki Technical Review, vol. 61, No. 154; pp. 59–62.

*Primary Examiner*—Michael Horabik
*Assistant Examiner*—William H. Wilson, Jr.
*Attorney, Agent, or Firm*—Jenkens & Gilchrist, P.C.

[57] ABSTRACT

A broadcast message indicating the utilization level associated with Stand-alone Dedicated Control Channels (SDCCH) within a mobile telecommunications network serving a particular geographic area is transmitted over a broadcast channel. A plurality of mobile stations located within that particular geographic area monitoring the broadcast channel then receives the transmitted message. Thereafter, a mobile service request with a lower priority level than the indicated status level is queued by the associated mobile station and delayed until the channel utilization level rescinds to a network acceptable level.

26 Claims, 6 Drawing Sheets

OPTIMAL USE OF LOGICAL CHANNELS WITHIN A MOBILE TELECOMMUNICATIONS NETWORK

BACKGROUND OF THE INVENTION

1. Technical Field of the Invention

The present invention relates to a telecommunications network and, in particular, to the efficient management of channel resources within a digital mobile communications network.

2. Description of Related Art

The general name of the connection between a particular mobile station traveling within a particular cell area and the base transceiver station (BTS) providing radio coverage for that particular cell area is the "radio interface" or "air interface". Historically, the communications of information across the air interface between a base transceiver station (BTS) and a mobile station has employed, so-called, analog modulation techniques. For example, Frequency Division Multiple Access (FDMA) technology has been widely utilized to assign each mobile station to one of a plurality of the frequency channels associated with the current cell area to communicate with the serving BTS. More recently, however, digital modulation techniques have been used in order to enhance the spectrum efficiency with which the bandwidth allotted to mobile communications is used. As an illustration, the two techniques of time division multiple access (TDMA) and code division multiple access (CDMA) have been utilized to allow communications to proceed between a BTS and a plurality of different mobile stations on a relatively limited amount of radio frequency bandwidth. The Global System for Mobile (GSM) communications system, for example, utilizes the TDMA concept with the allocation of one TDMA frame per carrier frequency channel to communicate between a mobile station and a BTS. Each frame is further subdivided into eight time-slots (TS). Each time-slot of a TDMA frame on a single frequency channel is referred to as a physical channel. Accordingly, there are eight physical channels per carrier in the GSM system. Each physical channel of the GSM system can be compared with one single channel in an FDMA-system, where every user is connected to the system via one of the associated frequencies.

The implementation of TDMA technology requires that a great quantity and variety of information must be transmitted between the serving BTS and the mobile station over the limited physical channels. For example, control data, service request data, actual traffic data, supplementary data, etc., have to be communicated over the physical channels. As a result, in order to distinguish one type of data from another, different logical channels have been named and mapped (assigned) on to the available physical channels. For example, actual speech is sent on the logical channel named "traffic channel (TCH)" occupying one or more physical channels. Paging of a called party mobile station is performed over the logical "paging channel (PCH)" while synchronization of a mobile station with a serving BTS is performed over the logical "synchronization channel (SCH)" which occupies one of the physical channels. Accordingly, depending on the type of information being transmitted, different logical channels are utilized. Needless to say, if more physical channels are assigned to a particular logical channel, a lesser number of physical channels are available for the rest of the logical channels.

Because of the limited physical channel resources, mobile service providers are often faced with channel resource management and dimensioning problems. One such problem includes effectively managing Stand-alone Dedicated Control Channels (SDCCH) within a serving mobile network. Because of the fact that congestion in SDCCH logical channels results in lost calls and unsuccessful call setups, the efficient management of SDCCH logical channels is critical for providing reliable mobile service to mobile stations traveling within the serving coverage area.

SDCCH logical channels are not only utilized for setting up call connections, but also for performing location updates for traveling mobile stations and for communicating packet messages containing text or graphic data between the serving mobile network and associated mobile stations. Conventionally, all of the above mentioned functionalities are provided the same priority and allowed equal access to available SDCCH channel resources. As a result, all of the available SDCCH channel resources could be occupied by Short Message Service (SMS) or Unstructured Supplementary Service Data (USSD) messages transporting text messages and could, as a result, prevent speech connections from being established between mobile stations and a serving mobile network. However, even though the support of all of the above mentioned functionalities is important for providing reliable and comprehensive mobile service to associated mobile stations, establishing call connections is by far the most important role performed by the mobile network.

Accordingly, there is a need for a mechanism to prioritize mobile services within a serving mobile network to better utilize available SDCCH logical channels.

SUMMARY OF THE INVENTION

The present invention discloses a method and apparatus for optimizing the utilization of Stand-alone Dedicated Control Channels (SDCCH) within a mobile telecommunications network for high priority mobile services. The level of utilization of SDCCH logical channels is maintained within a particular base station controller (BSC) serving a particular geographic area. After determining that such a level has exceeded a threshold value imposed by the serving telecommunications network, the BSC transmits data over a Broadcast Control Channel informing associated mobile stations traveling within its coverage area of such a determination. Thereafter, mobile stations wanting to request low priority mobile services are instructed to delay requesting one of the available SDCCH logical channels until the utilization level falls below the imposed threshold level. As a result, available SDCCH logical channels remain available for high priority mobile services within a congested mobile telecommunications network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
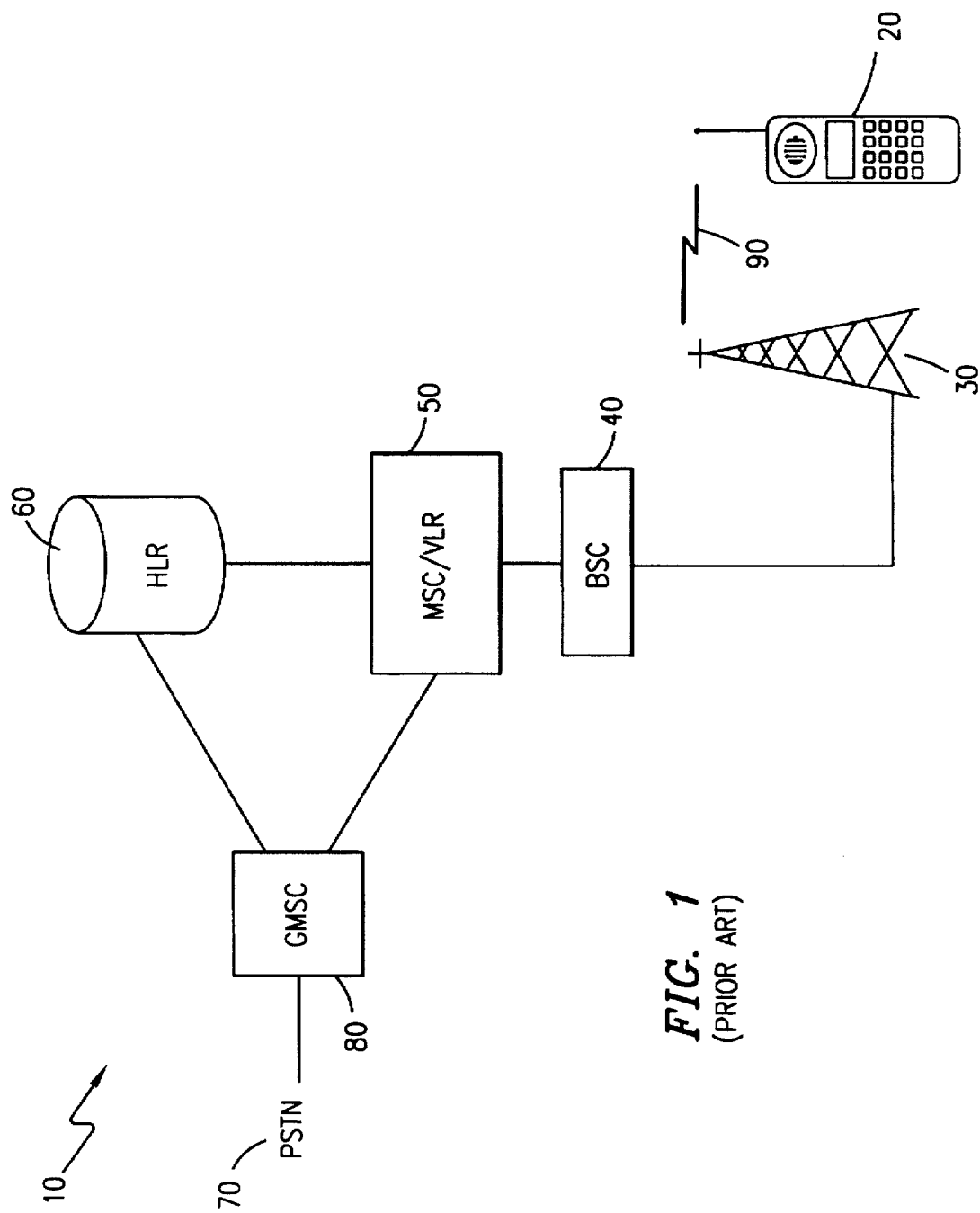
FIG. 1 is a block diagram of a prior art mobile telecommunications network illustrating a mobile station communicating with a serving base transceiver station (BTS)

FIG. 1 is a block diagram of a Public Land Mobile Network (PLMN) 10 illustrating a mobile station 20 communicating with a serving base transceiver station (BTS) 30. A geographic area associated with a particular Public Land Mobile Network (PLMN) 10 is partitioned into a number of smaller areas. Whenever a mobile station 20 travels into one of those smaller areas known as a "location area", the mobile station performs a location update with the serving PLMN. Such a location update informs the associated mobile switching center/visitor location register (MSC/VLR) 50 of the mobile station's presence. In case the mobile station 20 is an unregistered subscriber, a home location register (HLR) 60 associated with the newly registering mobile station 20 is identified and necessary communication is facilitated between the serving MSC/VLR 50 and the HLR 60 to authenticate the new mobile station 20. Requisite subscriber information related to the newly registering mobile station 20 is further requested and retrieved from the associated HLR 60 and stored at the serving MSC/VLR 50. Thereafter, the mobile station 20 is allowed to access mobile service within the serving MSC/VLR 50 coverage area.

Whenever an incoming call connection is requested towards the mobile station 20, a call setup signal, such as an Integrated Service Digital Network User Part (ISUP) based Initial Address Message (IAM) is received by a gateway mobile switching center (GMSC) 80 associated with the HLR 60. After performing HLR interrogation to ascertain the current location of the mobile station 20, the received incoming call setup signal is rerouted by the GMSC 80 to the MSC/VLR 50 currently serving the mobile station 20. The MSC/VLR 50 then determines the current location area of the mobile station 20 and instructs the appropriate base station controller (BSC) 40 to page the mobile station 20. The BTS 30 then pages the mobile station to alert the mobile station of an incoming call. As soon as the mobile station detects the paging message, the mobile station 20 sends a request for a signaling channel to the BSC 40. After allocating an idle signaling channel to the mobile station 20, the BSC 40 sends a message instructing the mobile station 20 to switch to that particular signaling channel. After communicating necessary control and service related data over the newly allocated signaling channel, a speech channel is subsequently seized and a call connection between the mobile station 20 and the BSC 40 is established via the BTS 30.

Initially, the communication interface 90 between the serving BTS 30 and the mobile station 20 employed so called analog modulation techniques. However, with the recent developments of digital communication technology, digital modulation techniques are being used to enhance the efficiency and capacity of data communications within a mobile telecommunications network. As an illustration, the techniques of time division multiple access (TDMA) or code division multiple access (CDMA) are being used to allow multiple communications to proceed on a relatively limited amount of radio frequencies. Global System for Mobile (GSM) based telecommunications networks, for example, utilize the TMDA technology with one TDMA frame per carrier frequency to communicate between a mobile station and a BTS.

Figure 2:
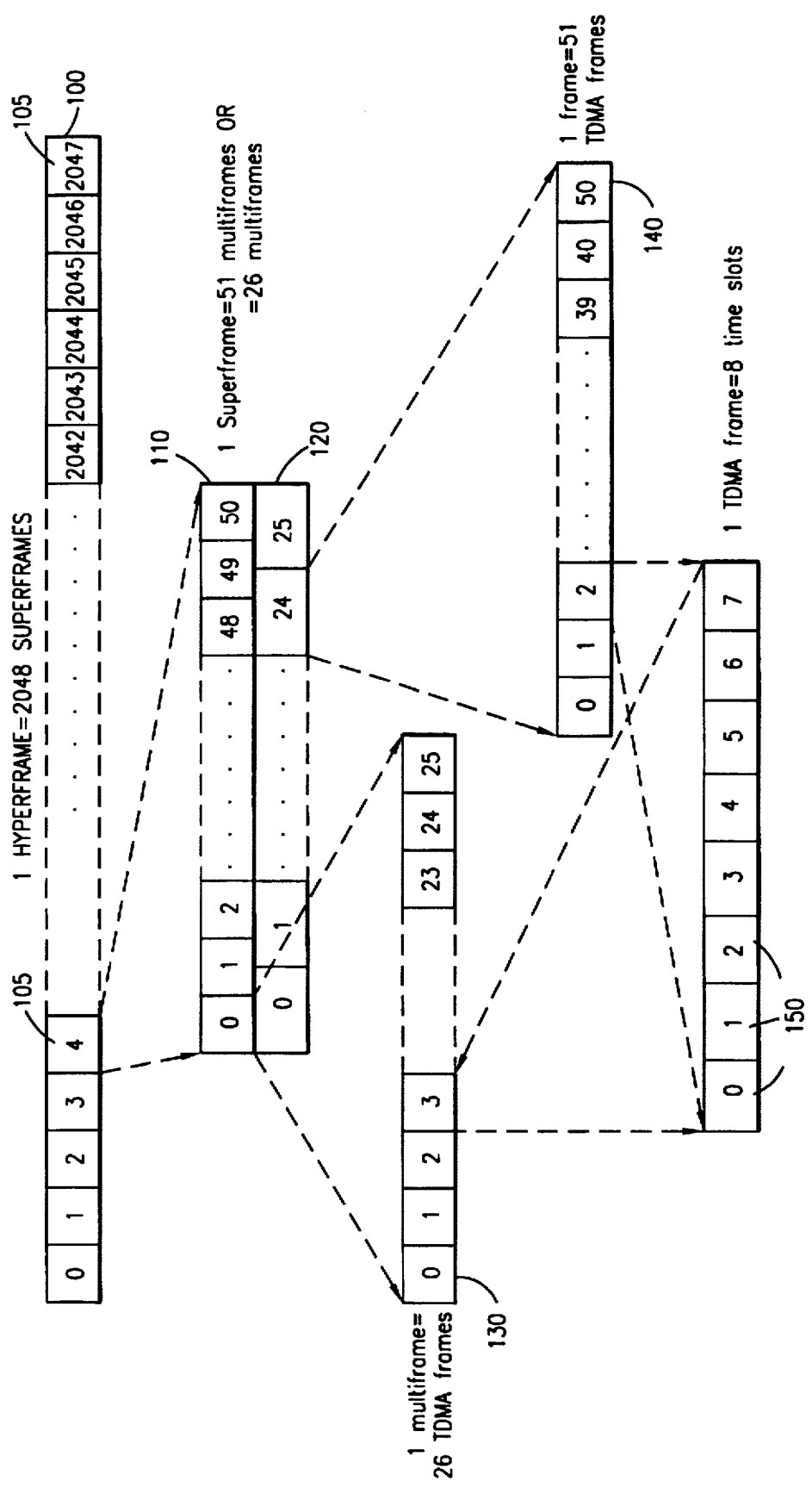
FIG. 2 is a block diagram of prior art physical channels allocated in accordance with the Time Division Multiple Access (TDMA) technology.

Reference is now made to FIG. 2 depicting a diagrammatic representation of time-frame structures within the GSM standard. The longest recurrent time period of the structure is called a hyperframe 100 and has the duration of 3 hours 28 minutes 53 seconds 760 ms. One hyperframe 100 is divided into 2048 superframes 105, each having a duration of 6.12 seconds. The superframe 105 is itself sub-divided into a number of multiframes. Two types of multiframes exist in the GSM standard. First, there is a fifty-one (51) frame multiframe 110 with a duration of 120 ms, comprising twenty-six (26) TDMA frames 130. Next, there is a twenty-six (26) frame multiframe 120 with a duration 235.4 ms, comprising fifty-one (51) TDMA frames 140. Lastly, each TDMA frame within a multiframe has eight time slots 150. Each of these eight physical time slots is equivalent to one Frequency Division Multiple Access (TMDA) channel serving a single mobile station.

A great quantity and variety of information must be transferred between the BTS and the mobile station. For example, paging to inform the mobile station of an incoming call has to be performed over one of the time slots. A request for mobile service further needs to be communicated over one of the time slots. Furthermore, the actual voice data must be communicated over the available time slots. Therefore, in order to distinguish one type of information over another, different logical channels have been introduced and assigned to each of the eight physical time slots.

Figure 3:
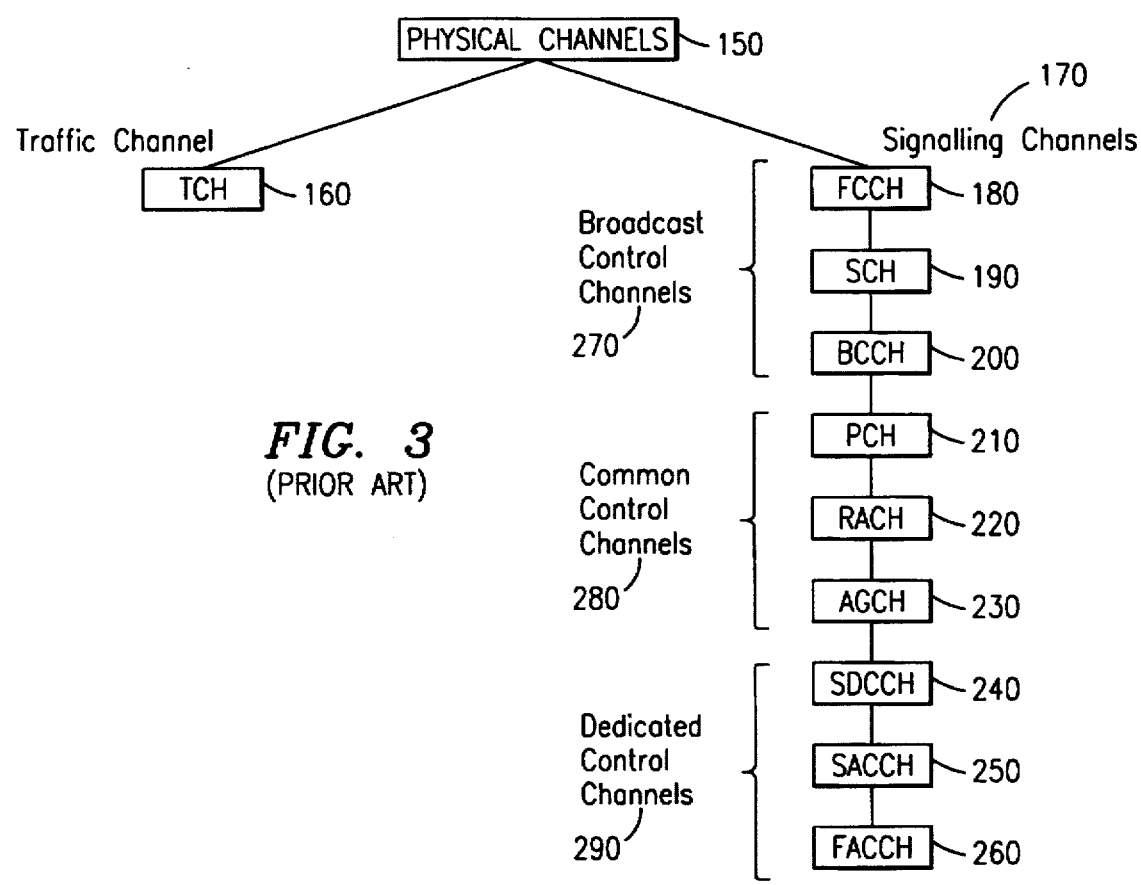
FIG. 3 is a block diagram of prior art different logical channels within a TDMA physical frame in accordance with the Global System for Mobile (GSM) standard.

Reference is now made to FIG. 3 illustrating different logical channels within the GSM standard which can be separated into two broad categories: traffic channels (TCH) 160 and signaling channels 170. Traffic channels (TCH) 169 are utilized by the serving BSC to communicate call data (e.g., voice data) with a particular mobile station traveling within its coverage area. On the other hand, signaling channels 170 are utilized by the serving BSC and BTS to communicate other control data necessary to implement the communication of call data with the mobile station.

Signaling channels are further subdivided into three categories: broadcast control channels 270, common control channels 280, and dedicated control channels 280. Each of the above three categories are then still further sub-divided into a number of logical channels for transporting different types of information between the serving BTS and the mobile station.

Broadcast control channels 270 are mainly utilized for communicating information from the serving BTS to a particular mobile station traveling within its coverage area (down-link) and include the Frequency Correction Channel (FCCH) 180, Synchronization Channel (SCH) 190, and Broadcast Control Channel (BCCH) 200. The Frequency Correction Channel (FCCH) 180 carries information for frequency correction of the mobile station. The Synchronization Channel (SCH) 190 carries information for frame synchronization of the mobile station and identification of the BTS. Lastly, the Broadcast Control Channel (BCCH) 200 is used to broadcast general system information about the cell to all mobile stations located within its location area. For example, the broadcast system information includes data about the network that the mobile station needs to be able to communicate with the network in an appropriate manner. Such information includes cell description, location area identity, neighbor cell description, etc.

Common control channels 280 include the Paging Channel (PCH) 210, Random Access Channel (RACH) 220, and Access Grant Channel (AGCH) 230. The Paging Channel (PCH) 210 is used on the downlink to page a mobile station. For example, when an incoming call setup request is received by the serving MSC/VLR, the appropriate BSC currently serving the mobile station is instructed to page the specified mobile station over a PCH. The Random Access Channel (RACH) 220, on the other hand, is used by the mobile station to request allocation of a Stand-alone Dedicated Control Channel (SDCCH) 240 to the BSC. For example, upon detecting the paging message informing the mobile station of an incoming call, the called party mobile station requests a SDCCH from the serving BSC over a RACH. After allocating an idle SDCCH, the BSC utilizes an Access Grant Channel (AGCH) 230 to communicate the identity of the allocated SDCCH to the requesting mobile station.

Dedicated control channels 290 include the Stand-alone Dedicated Control Channel (SDCCH) 240, Slow Associated Control Channel (SACCH) 250, and the Fast Associated Control Channel (FACCH) 260. The Stand-alone Dedicated Control Channel (SDCCH) 240 is used for signaling with a dedicated mobile station. Accordingly, the SDCCH 240 is the channel used for performing location update procedures whenever a mobile station enters a new location area. The SDCCH is also utilized to initiate a call setup and to seize a TCH. Furthermore, SDCCH logical channels are utilized by the serving mobile network to communicate Unstructured data, such as Short Message Service (SMS) or Unstructured Supplementary Service Data (USSD) messages with associated mobile stations. The Slow Associated Control Channel (SACCH) 250 is associated with a TCH 160 or an SDCCH 240. The SACCH 250 is a continuous data channel carrying continuous control information, such as measurement reports, timing advance and power order, between the serving BSC and the mobile station. Lastly, the Fast Associated Control Channel (FACCH) 260 is associated with a particular TCH to work in burst stealing mode to replace speech or data traffic with other necessary signaling.

As illustrated above, with nine different types of logical signaling channels and one logical traffic channel occupying the limited physical channels, the eight time slots within a TDMA frame need to be managed efficiently and effectively to provide reliable mobile service to mobile stations traveling within a particular BSC coverage area. Since logical channel assignments to physical channels can not be changed dynamically as demands for each logical channel changes within a serving network, determining the appropriate number of physical time slots to be assigned to each of the logical channels is crucial. Especially since congestion in the two of the most frequently utilized logical channels (SDCCH and TCH) results in failed call connection and lost calls. Therefore, even after allocating an appropriate number of physical channels to each logical channel, efficient management of channel resources is further necessary to maximize the potential utilization of available logical channels.

Figure 4:
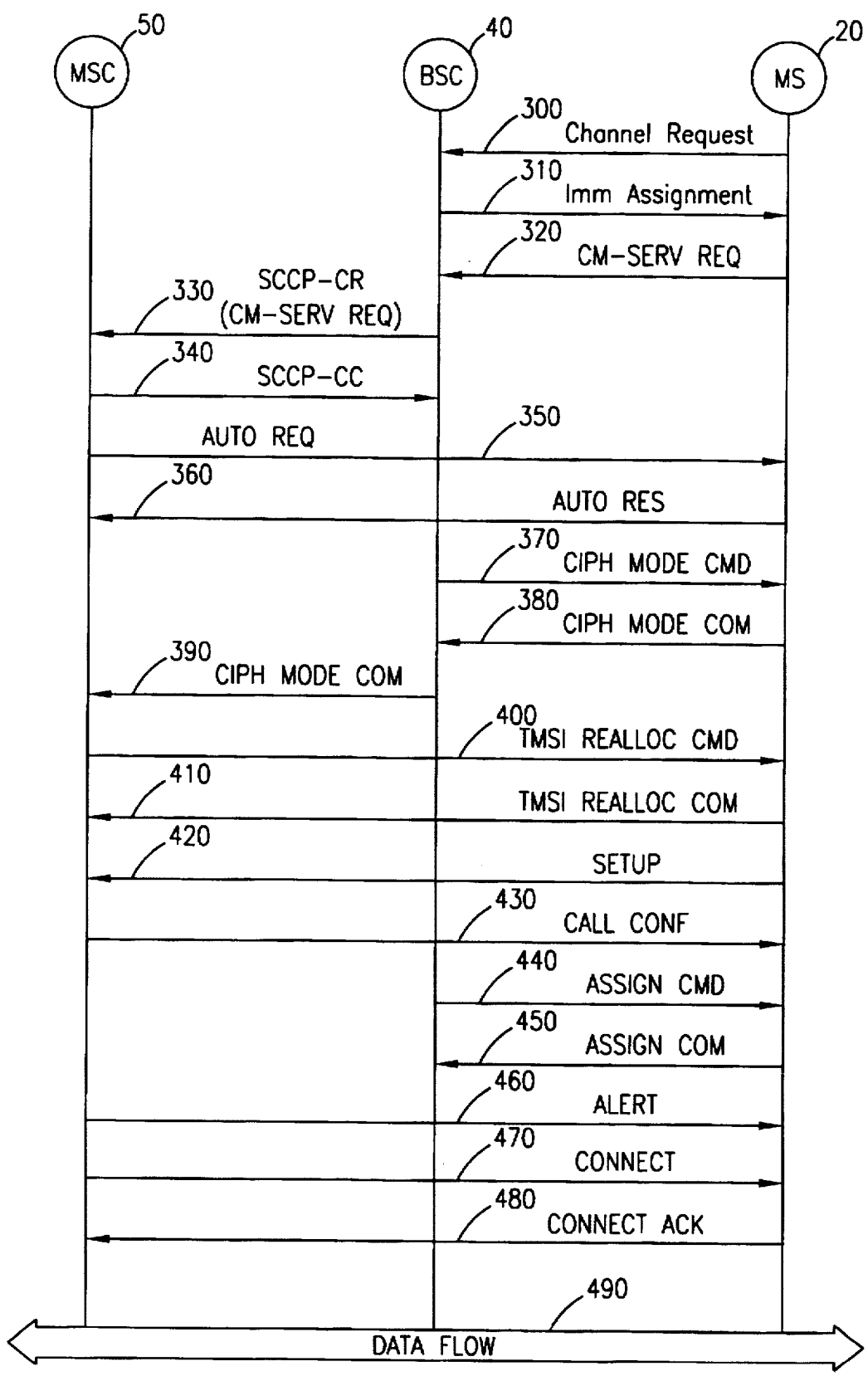
FIG. 4 is a signal sequence diagram illustrating the prior art communication of different messages for originating an outgoing call connection.

FIG. 4 is a signal sequence diagram illustrating a normal call setup procedure in accordance with the GSM standard. Whenever a mobile station 20 requests mobile service towards the serving mobile switching center (MSC) 50, either for originating an outgoing call connection or for receiving an incoming call connection, the mobile station 20 transmits a channel request message over a Random Access Channel (RACH) towards the connected BSC 40. After communicating with the associated MSC 50, an available SDCCH channel is allocated. The serving BSC 40 then transmits an Immediate Assignment Command message 310 to the serving BTS 30 (not shown in FIG. 4) to assign the allocated SDCCH to the requesting mobile station 20. The Immediate Assignment message 310 is further transmitted to the requesting mobile station 20 to instruct the mobile station 20 to switch to the assigned SDCCH. Utilizing the assigned SDCCH logical channel, the mobile station 20 requests mobile service from the serving MSC 50 by transmitting a Ciphering Mode Service Request(CM Serv. Req.) message 320. The serving BSC 40 then sets up an Signaling Connection Control Part (SCCP) connection with the MSC 50 by transmitting a SCCP-Connection Request (CR) message 330. The received CM-SERV. REQ. message 320 may further be "piggy-backed" to the transmitted SCCP-CR message 330. The serving MSC 50 is then aware of the mobile station's request for mobile service. As a result, the MSC 50 attempts to authenticate the mobile station 20 by transmitting an Authentication Request message 350 to the mobile station 20 transparently through the connected BSC 40 and over the assigned SDCCH logical channel. The mobile station 20, in response, attempts to comply with the authentication process by returning an Authentication Response message 360 to the serving MSC 50. If the authentication procedure is successfully performed, the ciphering mode setting procedure may be initiated by the serving MSC 50. Accordingly, the serving MSC 50 sends a Ciphering Mode Command (not shown in FIG. 4) to BSC 40. The BSC 40, in turn, transmits a Ciphering Mode Command message 370 including a cipher key to the mobile station 20 over the assigned SDCCH logical channel. The provided cipher key is then later utilized by the serving BTS and the mobile station to cipher and decipher digital data transmitted over the radio interface. After storing the received cipher key, the mobile station 20 returns a Ciphering Mode Complete message 380 to the serving BSC 40 over the assigned SDCCH logical channel. The received Ciphering Mode Complete message 390 is then transmitted to the serving MSC 50. Furthermore, in order to guarantee the mobile subscriber's confidentiality, instead of identifying the mobile station with its permanently assigned International Mobile Subscriber Identity (IMSI) number, a Temporary Mobile Subscriber Identity (TMSI) number is further assigned by the serving MSC 50. The assigned TMSI number is then included in a TMSI Reallocation Command message 400 and transmitted to the mobile station 20 over the assigned SDCCH logical channel. The mobile station 20 then confirms the receipt of the assigned TMSI number by transmitting a TMSI Reallocation Complete message 410 over the assigned SDCCH logical channel back to the serving MSC 50. The mobile station 20 is now prepared to originate an outgoing call connection and transmits a Call Setup message 420 towards the serving MSC 50. The transmitted Setup message 420, for example, includes the directory number associated with the intended called party subscriber. The serving MSC 50 then acknowledges the call setup signal by transmitting a Call Confirmation message 430 back to the requesting mobile station 20 over the assigned SDCCH logical channel. The BSC 40 then selects an idle traffic channel (TCH) and instructs the mobile station 20 to tune to the newly allocated TCH logical channel by transmitting an Assignment Command message 440 over the SDCCH logical channel. As an acknowledgment, the mobile station 20 returns an Assignment Complete message 450 back to the serving MSC 50 indicating that the traffic channel is up and running. The BSC then releases the no-longer-needed SDCCH logical channel. An Alert message 460 is then transmitted from the serving BSC 40 to the mobile station 20 informing the mobile station that a ringing tone has been generated by the serving MSC 50. Thereafter, a Connect signal 470 is transmitted from the mobile station 20 to the serving MSC 50. The serving MSC 50 then acknowledges the connect signal by returning a Connect Acknowledgment message 480 to the requesting mobile station 20. Thereinafter, speech connection is established over the newly allocated TCH logical channel allowing the mobile station 20 to communicate data (e.g., voice) with its called party subscriber.

It is to be understood that the call originating procedure illustrated above is for exemplary purposes only and that call termination procedures for an incoming call setup are also applicable in the sense that the SDCCH is also needed and extensively utilized before a call can be terminated towards its called party mobile station.

As illustrated above, until a TCH logical channel is seized enabling a mobile subscriber to communicate with another telecommunications terminal, a great variety and quantity of information needs to be exchanged between the serving mobile network and the requesting mobile station over a SDCCH logical channel. Such information includes authentication data, channel assignment data, service request data, TMSI number data, and call setup information data. Accordingly, without an available SDCCH channel, even if a TCH logical channel is available, a mobile station is not able to access mobile service. Such mobile service includes not only call setup requests as explained above but a number of other functionalities. Each time a mobile station travels into a new location area being served by a new BSC, the traveling mobile station needs to perform a location update with its associated home location register (HLR) over a SDCCH logical channel. Periodically, the mobile station then has to inform the serving BSC and MSC that the mobile station is still within the service area by performing International Mobile Subscriber Identity (IMSI) Attach procedures over SDCCH logical channels. Terminating call connections, in a manner similar to as described above, also need SDCCH logical channels to alert mobile stations and to establish terminating call connections. Furthermore, unstructured data, such as Short Message Service (SMS) and Unstructured Supplementary Service Data (USSD) messages are also communicated over SDCCH logical channels. With all of the above described mobile services attempting to seize and utilize a limited number of SDCCH logical channels within a particular mobile telecommunications network, providing efficient and effective SDCCH logical channel resource management becomes crucial for providing reliable and efficient mobile service to associated mobile stations.

Figure 5:
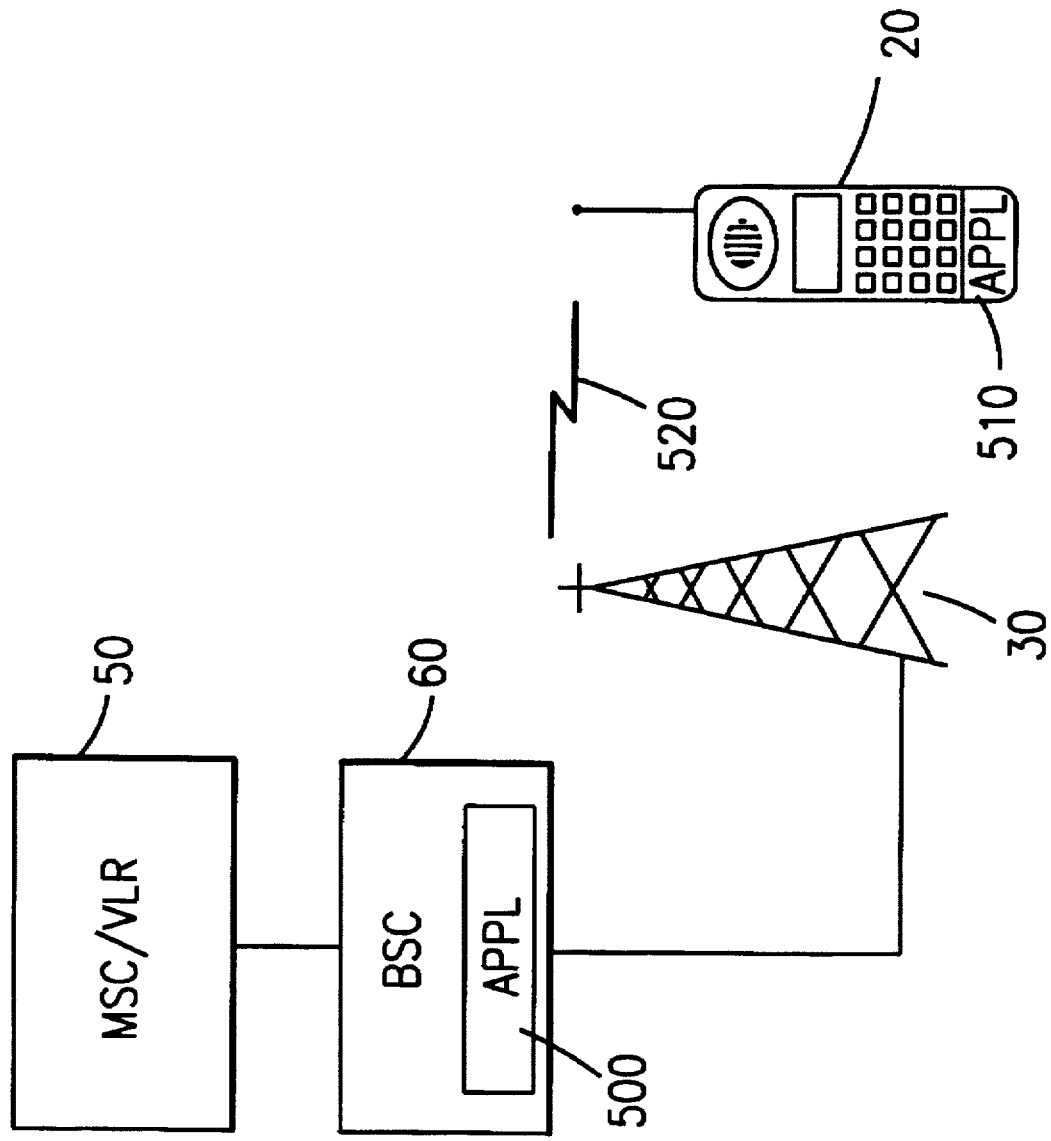
FIG. 5 is a block diagram of a serving mobile network transmitting Stand-alone Dedicated Control Channel (SDCCH) status information to a mobile station in accordance with the teachings of the present invention.

Reference is now made to FIG. 5 illustrating a serving mobile network transmitting Stand-alone Dedicated Control Channel (SDCCH) status information to a mobile station in accordance with the teachings of the present invention. A telecommunications node associated with a particular geographic area, such as a cell area, maintains statistical data representing the utilization level of SDCCH logical channels associated with that particular area. Such a telecommunications node may comprise a base station controller (BSC) 60 serving that particular geographic area. It may further comprise a base transceiver station (BTS) serving that particular cell area. Each time a SDCCH channel is requested and allocated by one of the associated base transceiver station (BTS) 30 for a particular mobile station, the statistical data associated with that particular cell area is updated by an application module 500 associated with the BSC 60. Similarly, each time an allocated SDCCH logical channel is released by a mobile station, the statistical data is updated to reflect the availability of the released channel within the geographic area.

In case the maintained statistical data reflecting the level of SDCCH utilization exceeds a threshold level imposed by the associated mobile telecommunications network, indication is noted that the level of SDCCH utilization within the serving geographic area has reached an undesirable level and there are inadequate amount of available SDCCH logical channels remaining to adequately handle potential high-level mobile service requests from its associated mobile stations. As a result, the application module 500 transmits a broadcast message to all mobile stations located within its coverage area over one of its broadcast channels. In order to reach all mobile stations currently traveling within the effected geographic area, the message may be transmitted over a Broadcast Control Channel (BCCH). The transmitted broadcast message indicates the over-utilization of SDCCH logical channel resources within the current geographic area and instructs the receiving mobile stations to delay requesting low-level mobile service from the serving mobile network.

As another embodiment of the present invention, a plurality of threshold levels may be assigned to the serving mobile telecommunications network. As an illustration, a first threshold level is assigned allowing access to all mobile services except the lowest level mobile services, such as SMS or USSD services. A second threshold level may further be assigned to restrict the next level of mobile service. For example, location updates and IMSI attach may further be restricted from accessing the network. The highest threshold level may then be imposed to allow only access for call connections. Such a hierarchical structure of mobile services may be identified and determined by the service operator and freely associated with dynamically assignable threshold values. The serving BSC 60 then transmits an appropriate broadcast message informing the associated mobile stations with which level the current utilization level is currently associated.

Upon receiving such SDCCH status information, a mobile station wanting to request mobile service first determines whether the mobile service has higher priority than the received SDCCH status. If the desiring mobile service has lower priority than the current SDCCH resource status, an application module 510 within the mobile station 20 queues the received requests. An indication to the associated mobile subscriber that the requested mobile service is being queued and delayed may further be displayed. Thereafter, the mobile station 20 periodically monitors the BCCH logical channel to determine whether the SDCCH utilization level has been reduced enough to allow access to the mobile network. Such a determination can be made by a number of ways. A different broadcast message may be transmitted by the serving BSC 60 notifying the mobile stations traveling within its effective area that the SDCCH utilization level has decreased. As an alternative, if the monitoring mobile stations no longer receives broadcast messages over the BCCH logical channel, a presumption is then made by the application module 510 that the restriction on the SDCCH channel request is no longer valid. The application module 510 then retrieves the previously queued request and the retrieved mobile service request is then performed in a conventional manner.

Figure 6:
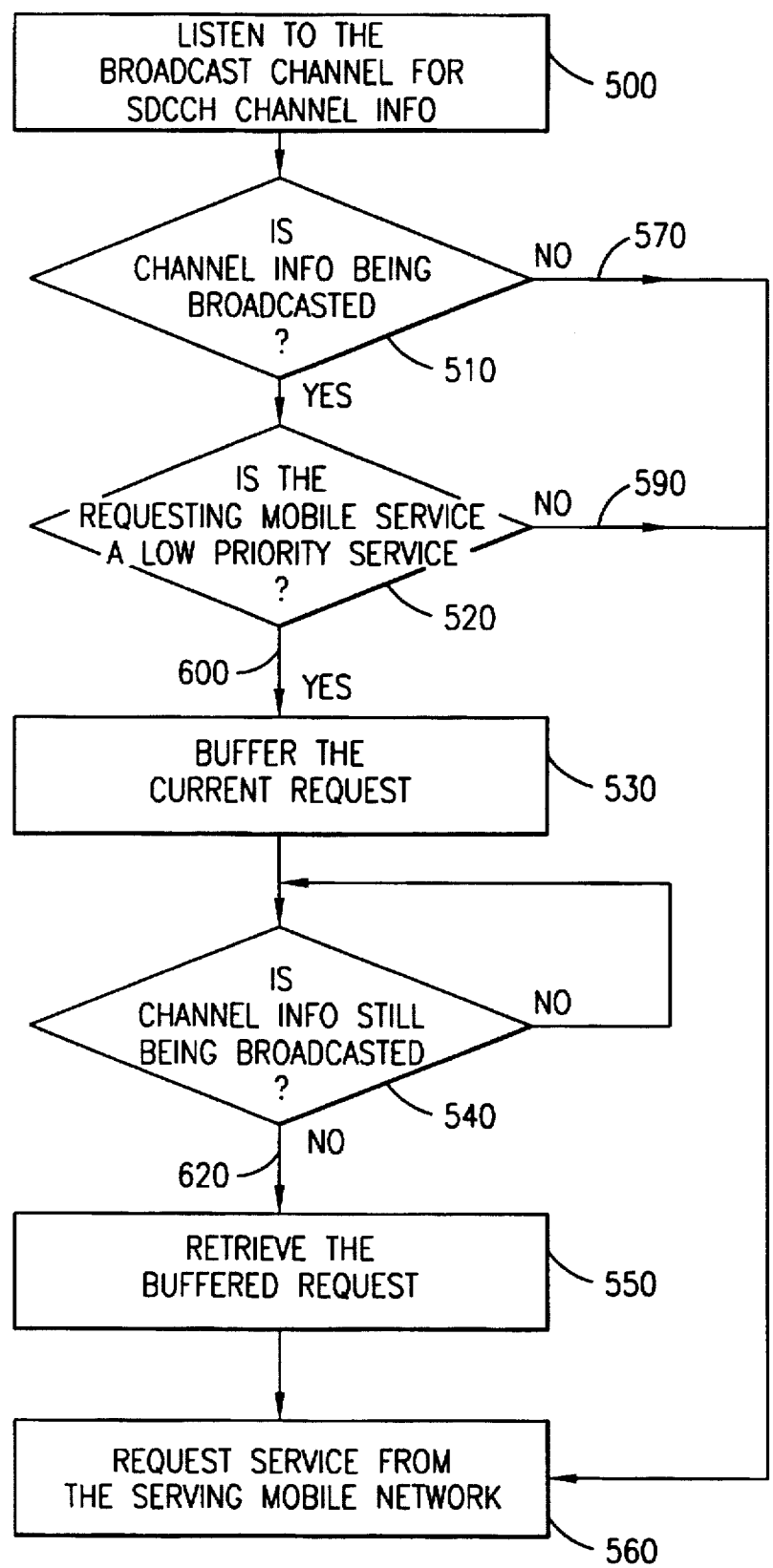
FIG. 6 is a flow-chart illustrating the steps performed by a mobile station to request mobile service towards a serving mobile network in accordance with the teachings of the present invention.

Reference is now made to FIG. 6 illustrating the steps performed by a mobile station to comply with the SDCCH resource management procedure in accordance with the teachings of the present invention. A broadcast channel, such as the Broadcast Control Channel (BCCH), is periodically monitored by the mobile station currently located within the particular geographic area at step 500. Thereafter, the mobile station receives an indication to request mobile service towards the serving mobile network. Such an indication may include an associated subscriber entering a directory number, service codes or function keys. Moreover, such an indication may be generated and detected internally within the mobile station. Furthermore, such mobile service may include originating an outgoing call connection, transmitting SMS or USSD messages, or performing location update. In response, an application module associated with the mobile station determines whether a broadcast message associated with the SDCCH resources has been received over the BCCH logical channel. If no such status message has been received, the mobile station takes the "No" decision link 570 and performs the requested mobile service in a conventional manner at step 560. On the other hand, if such status information has been received over the broadcast channel, the mobile station compares the priority of the requested mobile service with the received SDCCH resource status at step 520. If the mobile station is requesting a service higher than the SDCCH resource status currently indicated by the received broadcast message, the mobile station takes the "No" decision link 590 and requests the mobile service in a conventional manner at step 560. If, however, the requesting mobile service has lower priority than the received channel resource status, the application module associated with the mobile station delay transmitting the request by buffering or queuing the received request. Such a request may be queued within a Subscriber Identity Module (SIM) card associated with the mobile station.

Thereafter, the mobile station monitors the broadcast channel to determine whether the channel resource utilization level has decreased enough to enable the mobile station to request the queued mobile service. As described previously, such a determination can be made either by receiving a different broadcast message indicating a lower utilization level or by not receiving any broadcast message over a predetermined period of time. As an illustration, if the same broadcast message restricting the mobile station from requesting low level mobile service is being transmitted over the BCCH logical channel, the mobile station awaits until the restricting message is no longer received at step 540.

After making a determination that the SDCCH utilization level has decreased, the mobile station then retrieves the previously queued mobile service at step 550. The retrieved mobile service is then requested in a conventional manner at step 560.

Accordingly, by enabling mobile stations to comply with transmitted broadcast messages, the serving mobile telecommunications network is able to better utilize valuable SDCCH logical channel resources for high priority mobile service when the SDCCH utilization has exceed an undesirably high level.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for communicating data reflecting the status of channel resources to a plurality of mobile stations within a mobile telecommunications network, said method comprising the steps of:

maintaining a plurality of first channels for facilitating data communication between a telecommunications node serving said plurality of mobile stations and said plurality of mobile stations;

first determining that the utilization of said plurality of first channels by some of said plurality of mobile stations has reached a threshold level associated with said telecommunications node;

transmitting, in response to said first determination, first data reflecting the scarcity of said plurality of first channels to said plurality of mobile stations over a second channel, said first data instructing said plurality of mobile stations to refrain until later authorized from sending requests for mobile services to said telecommunications node over respective ones of said plurality of first channels;

second determining that said utilization of said plurality of first channels has fallen below said threshold level; and transmitting, in response to said second determination, second data reflecting the availability of said plurality of first channels to said plurality of mobile stations over said second channel, said second data authorizing said plurality of mobile stations to send said requests for mobile services to said telecommunications node over respective ones of said plurality of first channels.

2. The method of claim 1 wherein said telecommunications node is associated with a plurality of threshold levels and wherein said step of first determining further comprises the step of determining with which one of said plurality of threshold levels the utilization of said plurality of first channels is associated and wherein said transmitted first data further indicates with which one of said plurality of threshold levels the utilization of said plurality of first channels is associated.

3. The method of claim 1 wherein said mobile services include a Short Message Service (SMS).

4. The method of claim 1 wherein said mobile services include an Unstructured Supplementary Service Data (USSD) service.

5. The method of claim 1 wherein said plurality of first channels comprise Stand-alone Dedicated Control Channels (SDCCHs).

6. The method of claim 1 wherein said second channel comprises a Broadcast Control Channel.

7. A system for communicating data indicating the status of channel resources to a plurality of mobile stations within a mobile telecommunications network, said channel resources associated with a plurality of first logical channels for facilitating data communication between said plurality of mobile stations and a telecommunications node serving said plurality of mobile stations, comprising:

an application module for maintaining said plurality of first logical channels;

a processor for making a determination concerning the utilization of said plurality of first logical channels by some of said plurality of mobile stations in comparison to a threshold level associated with said telecommunications node; and a transmitter for transmitting, in response to said determination being in excess of said threshold level, first data reflecting the scarcity of said plurality of first logical channels to said plurality of mobile stations over a second logical channel, said first data instructing said plurality of mobile stations to refrain until later authorized from sending requests for mobile services to said telecommunications node over respective ones of said plurality of first logical channels, and for transmitting, in response to said determination being less than said threshold, second data reflecting the availability of said plurality of first logical channels to said plurality of mobile stations over said second logical channel, said second data authorizing said plurality of mobile stations to send said requests for mobile services to said telecommunications node over respective ones of said plurality of first logical channels.

8. The system of claim 7 wherein said mobile services include a Short Message Service (SMS).

9. The system of claim 7, wherein said mobile services include an Unstructured Supplementary Service Data (USSD).

10. The system of claim 9 wherein said first logical channels comprise a Stand-alone Dedicated Control Channel (SDCCH).

11. The system of claim 7 wherein said first data are transmitted over a Broadcast Control Channel.

12. The system of claim 7 wherein said first logical channels are associated with a plurality of threshold levels and wherein said processor further determines, with respect to said first data, with which one of said plurality of threshold levels the utilization of said plurality of first logical channels is associated and wherein said transmitted first data further indicates with which one of said plurality of thresholds levels the utilization of said plurality of first logical channels is associated.

13. A method for communicating data reflecting the status of channel resources to a plurality of mobile stations within a mobile telecommunications network, said method comprising the steps of:

maintaining a plurality of first channels for facilitating data communication between a telecommunications node serving said plurality of mobile stations and said plurality of mobile stations;

determining that the utilization of said plurality of first channels by some of said plurality of mobile stations has reached a threshold level associated with said telecommunications node; and transmitting periodically, in response to said determination, status information reflecting the scarcity of said plurality of first channels to said plurality of mobile stations over a second channel, said status information instructing said plurality of mobile stations to refrain from sending requests for mobile services to said telecommunications node for so long as said status information continues to be transmitted.

14. The method of claim 13 further comprising the steps of:

determining that the utilization of said plurality of first channels has fallen below said threshold level; and discontinuing transmission of said status information over said second channel to said plurality of mobile stations, said discontinued transmission of said status information reflecting the availability of said plurality of first channels, said discontinued transmission of said status information authorizing said plurality of mobile stations to send said requests for mobile services to said telecommunications node over respective ones of said plurality of first channels.

15. The method of claim 13 wherein said telecommunications node is associated with a plurality of threshold levels and wherein said step of determining further comprises the step of determining with which one of said plurality of threshold levels the utilization of said plurality of first channels is associated and wherein said transmitted status information further indicates with which one of said plurality of threshold levels the utilization of said plurality of first channels is associated.

16. The method of claim 13 wherein said plurality of first channels comprise Stand-alone Dedicated Control Channels.

17. The method of claim 13 wherein said second channel comprises a Broadcast Control Channel.

18. A system for communicating data indicating the status of channel resources to a plurality of mobile stations within a mobile telecommunications network, said channel resources being associated with a plurality of first logical channels for facilitating data communication between said plurality of mobile stations and a telecommunications node serving said plurality of mobile stations, said system comprising:

an application module for maintaining said plurality of first logical channels;

a processor for making a determination concerning the utilization of said plurality of first logical channels by some of said plurality of mobile stations in comparison to a threshold level associated with said telecommunications node; and a transmitter for transmitting periodically, in response to said determination being in excess of said threshold, status information reflecting the scarcity of said plurality of first logical channels to said plurality of mobile stations over a second logical channel, said status information instructing said plurality of mobile stations to refrain from sending requests for mobile services to said telecommunications node over respective ones of said plurality of first logical channels for so long as said status information continues to be transmitted.

19. The system of claim 18 wherein said transmitter discontinues transmission of said status information to said plurality of mobile stations over said second logical channel in response to said determination being less than said threshold level, said discontinued transmission of said status information authorizing said plurality of mobile stations to send said requests for mobile services to said telecommunications node over respective ones of said plurality of first logical channels.

20. The system of claim 18 wherein said first logical channels are associated with a plurality of threshold levels and wherein said processor further determines with which one of said plurality of threshold levels the utilization of said plurality of first logical channels is associated and wherein said transmitted status information further indicates with which one of said plurality of threshold levels the utilization of said plurality of first logical channels is associated.

21. The system of claim 18 wherein said plurality of first logical channels comprise Stand-alone Dedicated Control Channels.

22. The system of claim 18 wherein said second logical channel comprises a Broadcast Control Channel.

23. A method for communicating data reflecting the status of channel resources to a plurality of mobile stations within a mobile telecommunications network, said method comprising the steps of:

maintaining a plurality of first channels for facilitating data communication between a telecommunications node serving said plurality of mobile stations and said plurality of mobile stations;

first determining a first priority reflecting the utilization of said plurality of first channels by some of said plurality of mobile stations in excess of a threshold level associated with said telecommunications node;

transmitting, in response to said first determination, said first priority to said plurality of mobile stations over a second channel, said transmitted first priority instructing said plurality of mobile stations to refrain until later authorized from sending requests for mobile services to said telecommunications node over respective ones of said plurality of first channels when said requests for mobile services have an associated priority less than said transmitted first priority;

second determining a second priority reflecting the utilization of said plurality of first channels by some of said plurality of mobile stations below said threshold level; and transmitting, in response to said second determination, said second priority to said plurality of mobile stations over said second channel, said transmitted second priority authorizing said plurality of mobile stations to send said requests for mobile services to said telecommunications node over respective ones of said plurality of first channels when said associated priority of said requests for mobile services exceeds said transmitted second priority.

24. A system for communicating data indicating the status of channel resources to a plurality of mobile stations within a mobile telecommunications network, said channel resources associated with a plurality of first logical channels for facilitating data communication between said plurality of mobile stations and a telecommunications node serving said plurality of mobile stations, comprising:

an application module for maintaining said plurality of first logical channels;

a processor for determining a priority reflecting the utilization of said plurality of first logical channels by some of said plurality of mobile stations in comparison to a threshold level associated with said telecommunications node; and a transmitter for transmitting said determined priority to said plurality of mobile stations over a second logical channel, if the utilization of said plurality of first logical channels exceeds said threshold level, said transmitted determined priority instructing said plurality of mobile stations to refrain until later authorized from sending requests for mobile services to said telecommunications node over respective ones of said plurality of logical channels when said requests for mobile services have an associated priority less than said transmitted determined priority, if the utilization of said plurality of logical channels is less than said threshold level, said transmitted determined priority authorizing said plurality of mobile stations to send said requests for mobile services to said telecommunications node over respective ones of said plurality of first logical channels when said associated priority of said requests for mobile services exceeds said transmitted determined priority.

25. A method for communicating data reflecting the status of channel resources to a plurality of mobile stations within a mobile telecommunications network, said method comprising the steps of:

maintaining a plurality of first channels for facilitating data communication between a telecommunications node serving said plurality of mobile stations and said plurality of mobile stations;

determining a priority reflecting the utilization of said plurality of first channels by some of said plurality of mobile stations in excess of a threshold level associated with said telecommunications node; and transmitting periodically, in response to said determination, said determined priority to said plurality of mobile stations over a second channel, said transmitted determined priority instructing said plurality of mobile stations to refrain from sending requests for mobile services to said telecommunications node for so long as said status information continues to be transmitted when said requests for mobile services have an associated priority less than said transmitted determined priority.

26. A system for communicating data indicating the status of channel resources to a plurality of mobile stations within a mobile telecommunications network, said channel resources being associated with a plurality of first logical channels for facilitating data communication between said plurality of mobile stations and a telecommunications node serving said plurality of mobile stations, said system comprising:

an application module for maintaining said plurality of first logical channels;

a processor for determining a priority reflecting the utilization of said plurality of first logical channels by some of said plurality of mobile stations in comparison to a threshold level associated with said telecommunications node; and a transmitter for transmitting periodically, in response to said determined priority reflecting the utilization of said plurality of first logical channels in excess of said threshold, said determined priority to said plurality of mobile stations over a second logical channel, said transmitted determined priority instructing said plurality of mobile stations to refrain from sending requests for mobile services to said telecommunications node over respective ones of said plurality of first logical channels for so long as said determined priority continues to be transmitted when said requests for mobile services have an associated priority less than said transmitted determined priority.

* * * * *